(12) United States Patent
Hung

(10) Patent No.: US 8,370,565 B2
(45) Date of Patent: Feb. 5, 2013

(54) BOOT SYSTEM

(75) Inventor: Kuo-Shu Hung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 262 days.

(21) Appl. No.: 12/947,726

(22) Filed: Nov. 16, 2010

(65) Prior Publication Data

US 2012/0042117 A1 Feb. 16, 2012

(30) Foreign Application Priority Data

Aug. 10, 2010 (TW) .............................. 99126604 A

(51) Int. Cl.
*G06F 12/00* (2006.01)
(52) U.S. Cl. ...................................................... 711/103
(58) Field of Classification Search .................. None
See application file for complete search history.

(56) References Cited

U.S. PATENT DOCUMENTS

| | | | |
|---|---|---|---|
| 2005/0283598 A1* | 12/2005 | Gaskins et al. | 713/2 |
| 2007/0174602 A1* | 7/2007 | Kao | 713/2 |
| 2009/0100307 A1* | 4/2009 | Lee | 714/746 |
| 2009/0113558 A1* | 4/2009 | Prabhakaran et al. | 726/27 |
| 2011/0055540 A1* | 3/2011 | Lin et al. | 713/2 |

* cited by examiner

*Primary Examiner* — Hiep Nguyen
(74) *Attorney, Agent, or Firm* — Altis Law Group, Inc.

(57) ABSTRACT

A boot system of an electronic device includes a central processing unit (CPU), a NAND flash, a synchronous dynamic random access memory (SDRAM), and a pulse count unit. The NAND flash and the SDRAM are electronically connected with the CPU. The pulse count unit is electronically connected with the CPU and the NAND flash. The pulse count unit may initialize and enable the NAND flash. The CPU reads a pre-boot loader stored in the NAND flash and loads the pre-boot loader in the SDRAM. The CPU executes the pre-boot loader stored in the SDRAM to boot the electronic device.

6 Claims, 5 Drawing Sheets

| Count step \ Pin state | Count pin0 | Count pin1 | Count pin2 | Count pin3 | $\overline{CE}$ | CLE | ALE | I/O | Definition |
|---|---|---|---|---|---|---|---|---|---|
| ① | 1 | 1 | 1 | 0 | 1 | 0 | 0 | 0 | NAND Flash IO disable |
| ② | 0 | 0 | 0 | 1 | 0 | 0 | 0 | 0 | NAND Flash IO enable |
| ③ | 1 | 0 | 0 | 1 | 0 | 0 | 0 | 0 | NAND Flash IO enable |
| ④ | 1 | 1 | 0 | 1 | 0 | 1 | 0 | 0 | CLE enable |
| ⑤ | 0 | 0 | 1 | 1 | 0 | 0 | 1 | 0 | ALE enable, read 8bit data |
| ⑥ | 1 | 0 | 1 | 1 | 0 | 0 | 1 | 0 | ALE enable, read 8bit data |
| ⑦ | 0 | 1 | 1 | 1 | 0 | 0 | 1 | 0 | ALE enable, read 8bit data |
| ⑧ | 1 | 1 | 1 | 1 | 0 | 0 | 1 | 0 | ALE enable, read 8bit data |
| ⑨ | Z | Z | Z | Z | Z | Z | Z | Z | High impedance |

FIG. 3 ously connected with the CPU 50 and receives a clock signal

BOOT SYSTEM

BACKGROUND

1. Technical Field

The present disclosure relates to a boot system of an electronic device.

2. Description of Related Art

Flash memory can constitute NOR flash or NAND flash. The NOR flash is generally used for a boot system of an electronic device. The NOR flash is more expensive than the NAND flash. However, most boot systems are designed for the NOR flash, such that it is difficult to replace the NOR flash with the NAND flash even if the NAND flash is advantageous in cost.

BRIEF DESCRIPTION OF THE DRAWINGS

FIG. 3 is a state table illustrating count steps of the pulse count unit and pin state of the NAND flash of FIG. 2.

DETAILED DESCRIPTION

Figure 1:
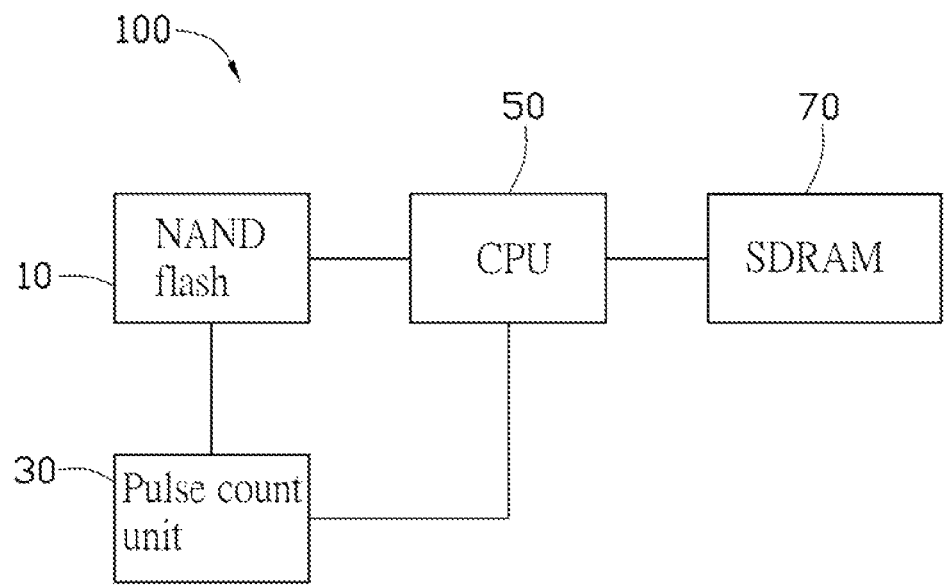
FIG. 1 is a block diagram of one embodiment of a boot system.

FIG. 1 is a block diagram of one embodiment of a boot system 100. The boot system 100 can be installed in an electronic device (not shown). The electronic device may be a computer, a mobile phone, a personal digital assistant (PDA), or a mobile Internet device (MID), for example. The boot system 100 includes a NAND flash 10, a pulse count unit 30, a central processing unit (CPU) 50, and a synchronous dynamic random access memory (SDRAM) 70. The NAND flash 10 is electronically connected with the CPU 50 and stores a pre-boot loader. The pulse count unit 30 is electronically connected with the NAND flash 10 and the CPU 50. The SDRAM 70 is electronically connected with the CPU 50.

Figure 2:
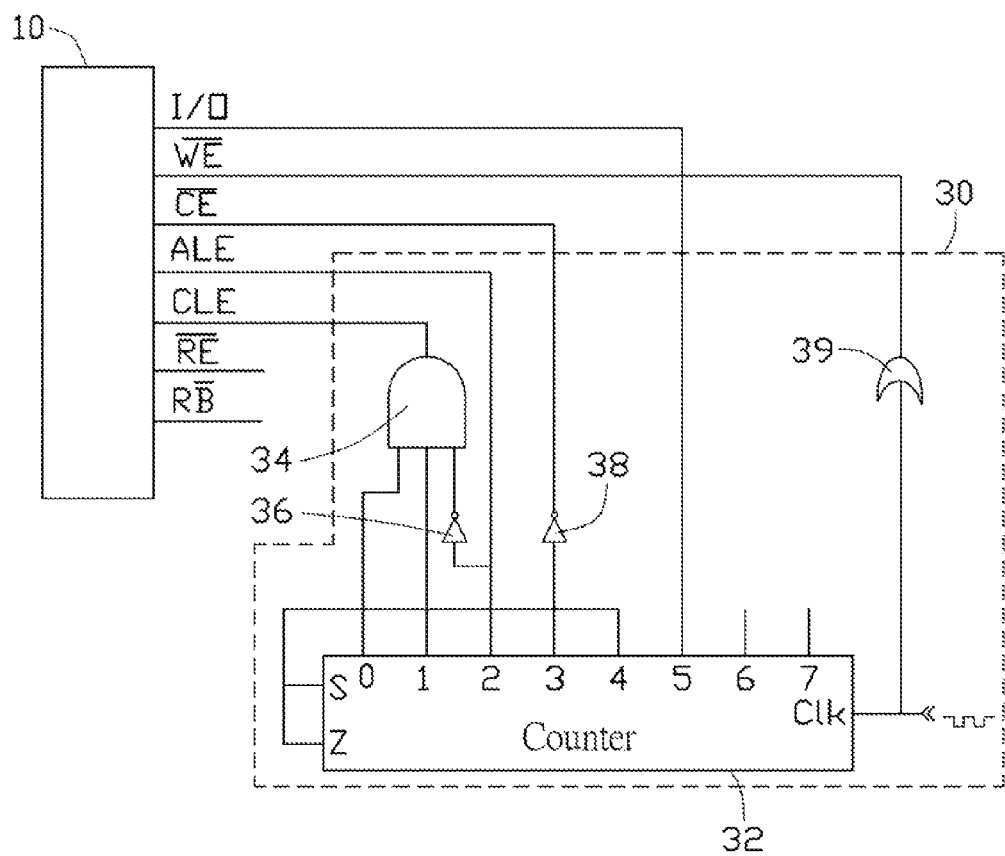
FIG. 2 is a circuit diagram of one embodiment of a NAND flash and a pulse count unit of FIG. 1.

FIG. 2 is a circuit diagram of one embodiment of the NAND flash 10 and the pulse count unit 30 of FIG. 1. The NAND flash 10 includes a data input/output pin I/O, a write enable pin $\overline{WE}$, a chip enable pin $\overline{CE}$, an address latch enable pin ALE, a command latch enable pin CLE, a read enable pin $\overline{RE}$, and a ready/busy pin R $\overline{B}$. The write enable pin $\overline{WE}$ is enabled in response to a low electric potential and configured to write data in the NAND flash 10. The chip enable pin $\overline{CE}$ is enabled in response to a low electric potential. The address latch enable pin ALE and the command latch enable pin CLE are enabled in response to a high electric potential. The read enable pin $\overline{RE}$ is enabled in response to a low electric potential and electronically connected with the CPU 50. The CPU 50 may control the read enable pin $\overline{RE}$ to read the pre-boot loader. The ready/busy pin R $\overline{B}$ is electronically connected with the CPU 50. The ready/busy pin R $\overline{B}$ outputs a signal of high electric potential to indicate a ready state, and outputs a signal of low electric potential to indicate a busy state.

The pulse count unit 30 may generate a pulse signal to initialize the NAND flash 10, and further enable or disable the pins of the NAND flash 10. The pulse count unit 30 includes a counter 32, a AND gate 34, a first NOT gate 36, a second NOT gate 38, and a gate delay 39. The counter 32 is an 8-bit counter and includes a clock pin Clk, count pins 0-7, a stop pin S, and a protection pin Z. The clock pin Clk is electronically connected with the CPU 50 and receives a clock signal from CPU 50. The clock pin Clk is further electronically connected with the write enable pin $\overline{WE}$ through the gate delay 39. As a result, the clock pin Clk may enable/disable the write enable pin $\overline{WE}$ after being delayed by the gate delay 39. The count pins 0-7 count from 00000000 in order and further enable/disable the pins of the NAND flash 10.

The AND gate 34 includes three input pins and an output pin. The count pins 0 and 1 are electronically connected with two ones of the three input pins. The count pin 2 is electronically connected with other one of the three input pins through the first NOT gate 36. The count pin 2 is further electronically connected with the address latch enable pin ALE. The output pin of the AND gate 34 is electronically connected with the command latch enable CLE. The count pin 3 is electronically connected with chip enable pin $\overline{CE}$ through the second NOT gate 38. The count pin 4 is electronically connected with the stop pin S and the protection pin Z. When the count pin 4 outputs value "1" (high electric potential), the protection pin Z is in a high impedance state and the counter 32 stops counting. As a result, the chip enable pin $\overline{CE}$ is also in a high impedance state to avoid influencing logic control of the CPU 50. The count pin 5 is electronically connected with the data input/output pin I/O. The count pins 6 and 7 are not connected.

FIG. 3 is a state table illustrating count step of the pulse count unit 30 and pin state of the NAND flash 10 of FIG. 2. The chip enable pin $\overline{CE}$ receives value "1" (low electric potential) during the count pin 3 outputs value "0" (i.e. the count pins 0-3 output 7 values, 0000, 1000, . . . , 1110). As a result, the NAND flash 10 is disabled. The chip enable pin $\overline{CE}$ receives value "0" (high electric potential) when the count pin 3 outputs a value "1". As a result, the NAND flash 10 is enabled. When the count pins 0-3 output value, 1101, the command latch enable pin CLE is enabled. When the count pins 0-3 output value from 0011 to 1111, the address latch enable ALE is enabled. When the count pin 4 outputs value "1", the counter 32 stops counting and the pins of the NAND flash 10 are in a high impedance state. The NAND flash 10 is initialized upon the counter 32 starts counting until the count pin 4 outputs value "1".

Figure 4:
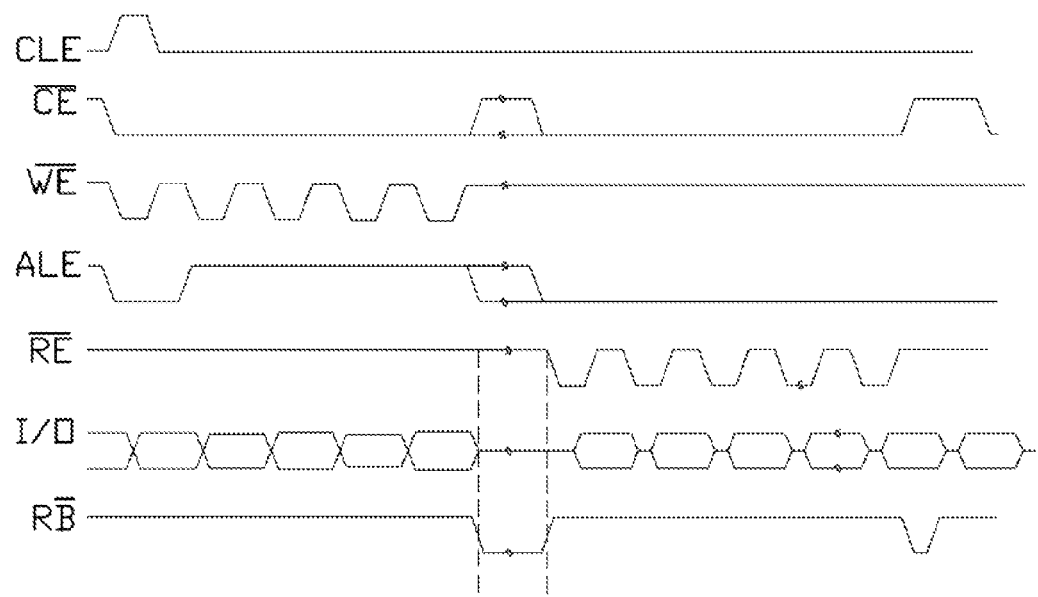
FIG. 4 is a read operation timing diagram of the NAND flash of FIG. 2.

FIG. 4 is a read operation timing diagram of the NAND flash 10 of FIG. 2. In step 2 of FIG. 3, the chip enable pin $\overline{CE}$ receives value, "0" and is enabled when the counter 32 counts until the count pins 0-3 outputs value, 0001. In step 4 of FIG. 3, the command latch enable pin is enabled. In step 5 of FIG. 3, the write enable pin $\overline{WE}$ and the address latch enable pin ALE are enabled. After a delay time provided by the gate delay 39, the ready/busy pin R $\overline{B}$ outputs a signal of high-low-high electric potential. As a result, the CPU 50 control the read enable pin $\overline{RE}$ to read a part (8-bit data) of the pre-boot loader whenever the read enable pin $\overline{RE}$ receives a low electric potential. The CPU 50 loads the pre-boot loader in the SDRAM 70 after completely reading the pre-boot loader.

Figure 5:
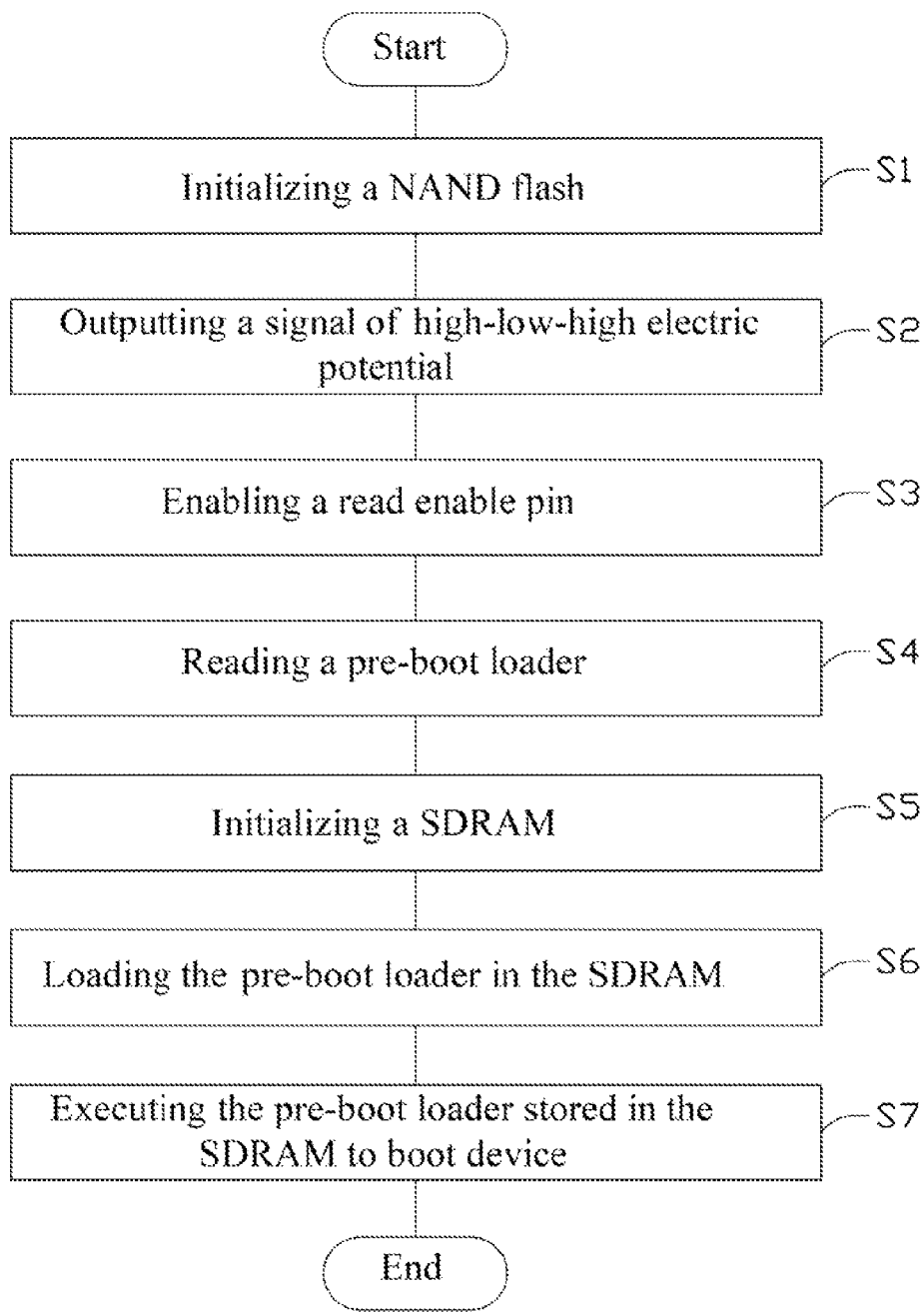
FIG. 5 is a flowchart illustrating one embodiment of a method for booting an electronic device.

FIG. 5 is a flowchart illustrating one embodiment of a method for booting the electronic device. Depending on the embodiment, additional blocks may be added, others removed, and the ordering of the blocks may be changed.

In block S1, the pulse count unit 30 initializes the NAND flash 10.

In block S2, the ready/busy pin R $\overline{B}$ outputs a signal of high-low-high electric potential.

In block S3, the read enable pin $\overline{RE}$ is enabled in response to a low electric potential.

In block S4, the CPU 50 controls the read enable pin $\overline{RE}$ to read the pre-boot loader.

In block S5, the CPU 50 initializes the SDRAM 70.

In block S6, the CPU 50 loads the pre-boot loader in the SDRAM 70.

In block S7, the CPU 50 executes the pre-boot loader stored in the SDRAM 70 to boot the electronic device.

The present disclosure provides a boot system of an electronic device employing a NAND flash. The cost of the electronic device may be reduced.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A boot system of an electronic device, comprising:
   a central processing unit (CPU);
   a NAND flash electronically connected with the CPU;
   a synchronous dynamic random access memory (SDRAM) electronically connected with the CPU; and
   a pulse count unit electronically connected with the CPU and the NAND flash, the pulse count unit comprising a counter, an AND gate, a first NOT gate, and a second NOT gate;
   wherein the counter comprises count pins 0-7, the AND gate comprises three input pins and an output pin, the count pins 0 and 1 are electronically connected with two input pins of the AND gate; the count pins 2 is electronically connected with other input pin of the AND gate through the first NOT gate; the count pin 3 is electronically connected with the second NOT gate, and the count pin 5 is electronically connected with the NAND flash;
   wherein the pulse count unit initializes and enables the NAND flash; and
   wherein the CPU reads a pre-boot loader stored in the NAND flash and loads the pre-boot loader in the SDRAM to boot the electronic device.

2. The booting system of claim 1, wherein the NAND flash comprises a read enable pin and a ready/busy pin; wherein the CPU control the read enable pin to read the pre-boot loader in response to a signal of high-low-high electric potential outputted from the ready/busy pin.

3. The booting system of claim 1, wherein the NAND flash comprises a command latch enable pin; wherein the output pin of the AND gate is electronically connected with the command latch enable pin.

4. The booting system of claim 1, wherein the NAND flash comprises:
   an address latch enable pin;
   a chip enable pin; and
   a data input/output pin;
   wherein the count pin 2 is electronically connected with the address latch enable pin;
   wherein the count pin 3 is electronically connected with chip enable pin through the second NOT gate; and
   wherein the count pin 5 is electronically connected with the data input/output pin.

5. The booting system of claim 1, wherein the counter further comprises:
   a stop pin and a protection pin;
   wherein the stop pin and the protection pin are electronically connected with the count pin 4; and
   wherein the counter stops counting and the protection pin is in a high impedance state when the count pin 4 outputs a high electric potential.

6. The booting system of claim 1, wherein
   the NAND flash comprises a write enable pin;
   the pulse count unit comprises a gate delay; and
   the counter comprises a clock pin;
   wherein the clock pin is electronically connected with the write enable pin through the gate delay and receives clock signals from the CPU.

* * * * *